No. 766,078. PATENTED JULY 26, 1904.
O. H. F. C. WALTER.
SECONDARY BATTERY.
APPLICATION FILED DEC. 1, 1903.
NO MODEL.
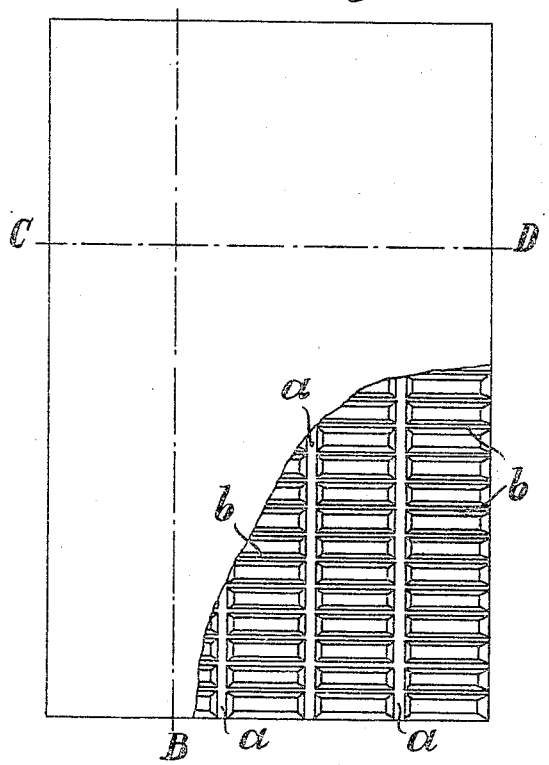
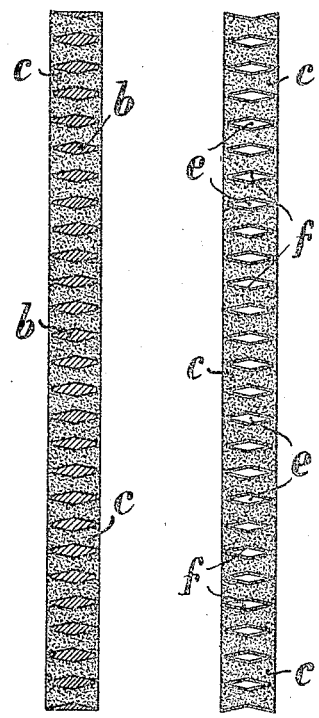
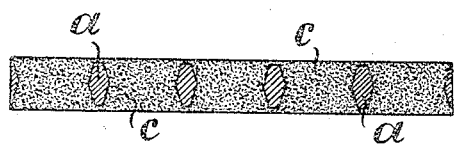
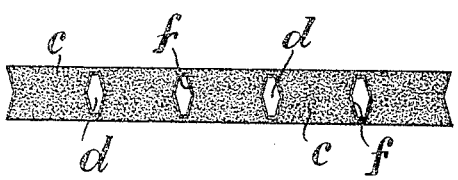
WITNESSES
H. M. Kuehne
John A. Percival
INVENTOR
Otto Heinrich Friedrich Carl Walter
BY
ATTORNEYS No. 766,078. Patented July 26, 1904.

UNITED STATES PATENT OFFICE.

OTTO HEINRICH FRIEDRICH CARL WALTER, OF BERLIN, GERMANY, ASSIGNOR TO THE FIRM OF PFLÜGER ACCUMULATOREN-WERKE, A. G., OF BERLIN, GERMANY.

SECONDARY BATTERY.

SPECIFICATION forming part of Letters Patent No. 766,078, dated July 26, 1904.

Application filed December 1, 1903. Serial No. 183,396. (No model.)

*To all whom it may concern:*

Be it known that I, OTTO HEINRICH FRIEDRICH CARL WALTER, a subject of the King of Prussia, German Emperor, residing at Berlin, in the Kingdom of Prussia, German Empire, have invented certain new and useful Improvements in Secondary Batteries; and I do hereby declare that the following is a full, clear, and exact description.

The present invention relates to plates of active mass for secondary batteries. The new plates of active mass are produced by subjecting plates or grids of lead or lead alloy or the like which have been pasted or, according to the Planté process, covered with an active layer to a temperature which is higher than the melting-point of the respective metal, so that the said metal fuses out of the plate. From the plate or grid only a thin porous film of lead or lead alloy remains on the surfaces which are in contact with the active mass. The active mass itself remains unhurt and contains the plate or grid, which consists of the thin porous films of lead or lead alloy.

In the accompanying drawings there is illustrated a new plate in elevation and section.

Figure 1 shows an elevation of the plate, a part of which is not covered with active mass. Figs. 2 and 3 show sections through the above plate on the lines A B and C D of Fig. 1 before the metal framework has been melted out. Figs. 4 and 5 are likewise sections on the lines A B and C D of Fig. 1; but they illustrate the plate after the metal framework has been melted out.

The supporting-plate illustrated in the drawings by way of example consists of vertical rods $a$ and horizontal rods $b$. This plate is covered in the usual manner with the paste $c$ and dried. The plate is then exposed to a temperature which is higher than the fusing-point of the metal of which the plate-frame is made. For instance, if the material be lead then a heat of from 400° to 500° Celsius will be requisite, whereas in the case of frames of lead and antimony, or lead, tin, and antimony, &c., much lower temperatures can be employed. After the plate has been exposed to the high temperature for a short time the metal forming the framework fuses and runs off, so that in place of the bars $a$ and $b$ hollow spaces $d$ and $e$ are formed, while the active mass which has filled the chambers or cells or otherwise of the frame remains unhurt. The metal does not fuse and run away without residue; but there remains on the surfaces in contact with the active mass a thin porous film $f$, which holds together the separate parts of the active mass. After the metal core has been fused out of the plate the latter can be utilized in the usual or any desired manner for secondary batteries.

The plates produced as hereinbefore described are very light in consequence of the removal of the metal core. Moreover, their capacity is very great, because the acid obtains access to the separate particles of the active mass not only from the outside, but also from the inside, inasmuch as it penetrates through the channels $d$ left by the fusing out of the metal and passes through the porous metallic films $f$.

It is quite immaterial in the new process whether the plate has been treated with current or not before fusing, also whether it be old or new. Moreover, it makes no difference whether a mass-plate or a plate which has been treated according to the Planté process be employed. Obviously, also, the cross-section of the plate is entirely immaterial—that is to say, whether it be a plate with bars of one or another form, whether the said plate be formed of separate bars or woven work, &c.

Having now described my invention and in what manner the same is to be performed, what I claim, and desire to secure by Letters Patent, is—

In plates of active mass for secondary batteries the arrangement of a system of interior channels and cavities, the walls of which consist of thin porous metallic films in intimate contact with the active mass, said films being the residues of a metal plate or grid melted away, substantially as described.

In witness whereof I have hereunto set my hand in presence of two witnesses.

OTTO HEINRICH FRIEDRICH CARL WALTER.

Witnesses:
  WOLDEMAR HAUPT,
  HENRY HASPER.